Figure 1:
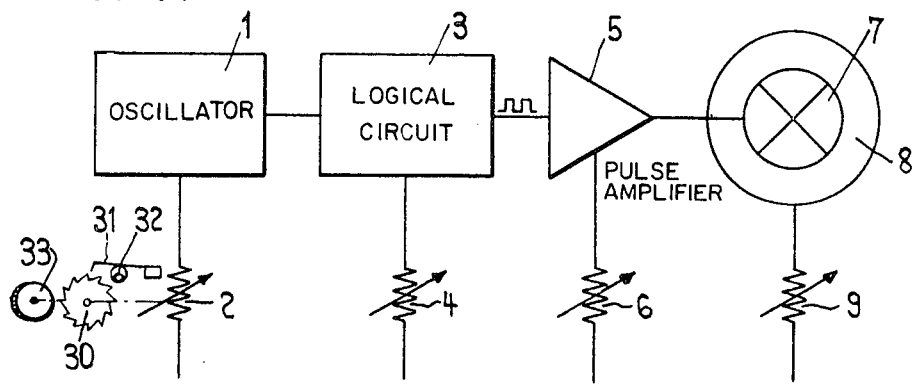

United States Patent [19]
Adler et al.

[11] 3,814,510
[45] June 4, 1974

[54] METHOD AND APPARATUS FOR MEASURING THE CRITICAL FLICKER FUSION FREQUENCY

[75] Inventors: Karl Adler, Grenchen; Georges Ducommun, Feldbrunnen, both of Switzerland

[73] Assignee: Biviator S.A., Grenchen, Solothurn, Switzerland

[22] Filed: Feb. 25, 1972

[21] Appl. No.: 229,492

[30] Foreign Application Priority Data
Mar. 5, 1971 Switzerland.......................... 3226/71

[52] U.S. Cl.................................... 351/36, 351/39
[51] Int. Cl............................................... A61b 3/02
[58] Field of Search................................ 351/36, 39

[56] References Cited
UNITED STATES PATENTS
3,424,519  1/1969  White ............................. 351/36 X
3,600,067  8/1971  Heine ....................................  31/12

OTHER PUBLICATIONS
P. J. Foley, "Light . . . Flicker," JOSA, Vol. 53, No. 8, Aug. 1963, pp. 975–977.

H. Ripps et al., "Effect . . . Brightness," JOSA, Vol. 51, No. 8, Aug. 1961, pp. 870–873.

P. J. Foley, "Critical . . . Surrounds," JOSA, Vol. 53, No. 4, April 1963, pp. 497–498.

C. Berger et al., "Electronic . . . Variation," JOSA, Vol. 45, No. 4, April 1955, pp. 307–308.

E. Simonson, "Flicker . . . Fusion," JOSA, Vol. 50, No. 4, April 1960, pp. 328–331.

*Primary Examiner*—John K. Corbin
*Assistant Examiner*—Paul A. Sacher
*Attorney, Agent, or Firm*—Imirie and Smiley

[57] ABSTRACT

A method and apparatus for measuring the critical flicker fusion frequency of a person, wherein flickering light pulses are displayed for observation on an area surrounded by a ring-shaped area illuminated by an adaptation light appearing as a constant non-flickering light.

12 Claims, 4 Drawing Figures

PATENTED JUN 4 1974 3,814,510

SHEET 2 OF 2

METHOD AND APPARATUS FOR MEASURING THE CRITICAL FLICKER FUSION FREQUENCY

This invention relates to a method and apparatus for measurement of the critical flicker fusion frequency of a person.

It is well known that the critical flicker fusion frequency, that is the frequency of light pulses at which a person observing such light pulses no longer has the impression of a flickering light but of a continuous light, may serve as a measure for the vigilance of this person. The critical flicker fusion frequency decreases from a normal value due to illness or fatigue of the person or due to the influence of alcohole, drugs or other facts.

It has now been found that prior methods and apparatus for measuring the critical flicker fusion frequency do not take into consideration all conditions to be fullfilled in order to achieve a correct, objective and reproducible measurement. Particularly, prior apparatus are equipped with flickering light sources only. Some apparatus also provide for binocular observation of two similar flickering light sources. Other apparatus have been proposed having a number of light sources flickering at different frequencies, or continuous light sources at the side of flickering light sources, the idea being, that the tested person should be able to distinguish light sources flickering at different frequencies or to distinguish continuous light sources from flickering light sources. None of these methods and apparatus has taken into consideration the problems of adaptation. However, it has now been found that these problems are of primordial importance when measuring the critical flicker fusion frequency.

It is an object of this invention to provide a method and apparatus meeting with all important conditions for properly measuring the critical flicker fusion frequency. According to this invention, the method wherein light pulses of variable frequency are produced for observation by the person to be tested by means of a flickering illumination appearing on a flickering light source, is substantially improved in that a ring of continuous adaptation illumination is produced round the flickering light source. Preferably the intensity of the adaptation illumination may be changed during one examination or for succeeding examinations of the same person in order to obtain measuring results under various conditions. It has been found that the frequency of the flickering light source, the intensity of the light pulses, the ratio between the duration of light pulses and dark periods between the same and the intensity of the continuous adaptation light may be changed within a practically unlimited range, the important condition being that the same parameters are used for obtaining comparable measurements of the same person.

Figure 2:
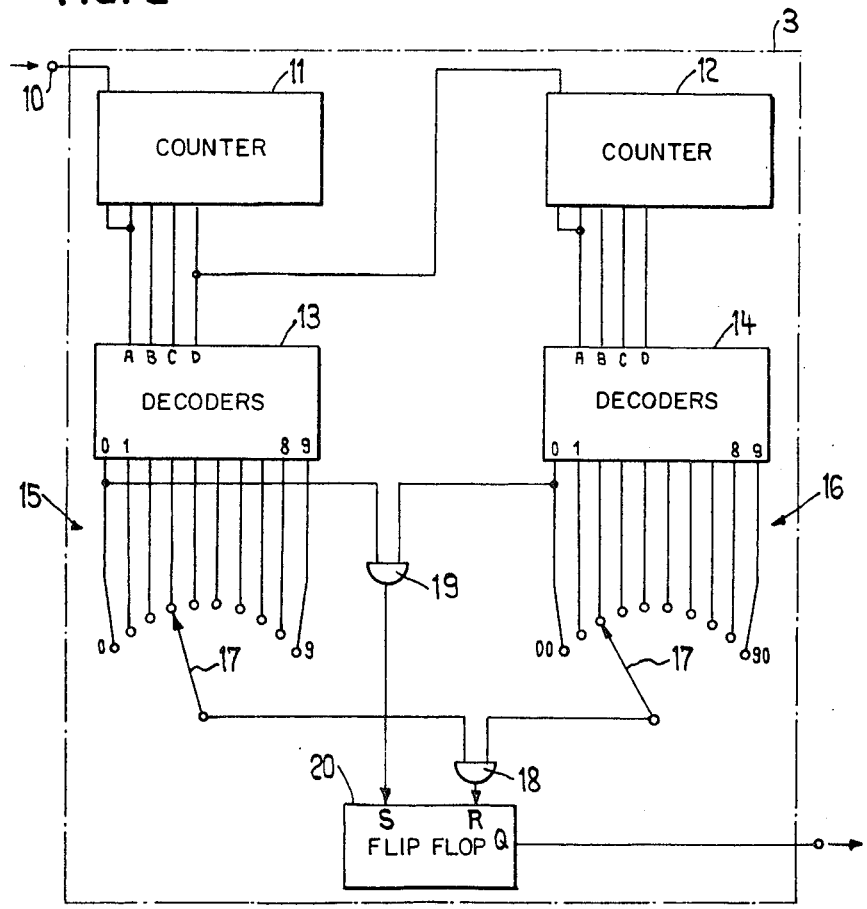
Figure 3:
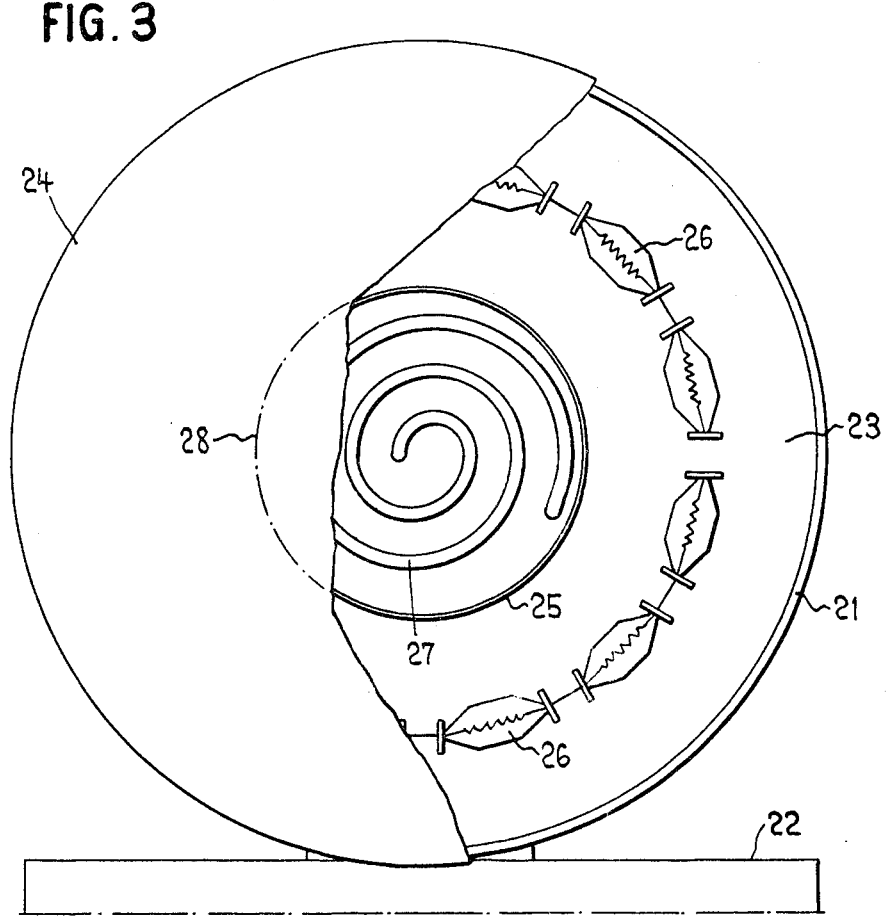
Figure 4:
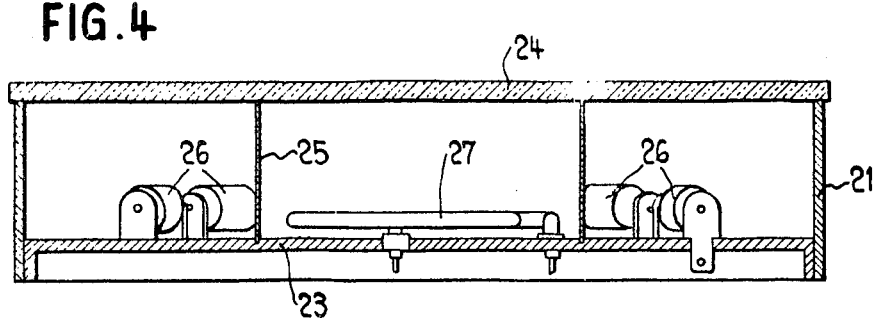

This invention will now be explained in more detail and by way of example with reference to the accompanying drawing wherein FIG. 1 is a schematic illustration of the basic parts of an embodiment of an apparatus for measuring the critical flicker fusion frequency, FIG. 2 is a block diagram of a counting dircuit for selection of the bright-dark ratio of the flickering light, FIG. 3 is a front view of a light source for display of the flickering light and adaptation light and FIG. 4 is a cross section of the light source shown in FIG. 3.

The basic parts of the apparatus are as shown in FIG. 1, namely an oscillator 1 adapted to oscillate in a relatively wide range of frequencies. Potentiometer 2 schematically illustrates the means for adjusting the oscillator frequency. The output frequency of oscillator 1 is fed to a logical circuit 3 allowing selection of the ratio of the duration of light pulses and the dark interval between light pulses. Potentiometer 4 schematically indicates the means for adjustment of the bright-dark ratio of the flickering light pulses. The output of logical circuit 3 is connected to the input of a power pulse amplifier 5 of which the power output may be controlled. Variable resistor 6 schematically illustrates the means for control of the power output which is fed to a flickering light source 7 as schematically indicated in FIG. 1. The flickering light source 7 is surrounded by an adaption light source 8 which may be fed through a variable resistor 9 for adjusting its intensity.

The oscillator 1 preferably includes a multivibrator of which the frequency may be selected by means of one or more variable resistors such as schematically illustrated at 2, within a range of 100 to 10,000 Hz. The oscillator may also include pulse shaper circuits well known in the art.

The output frequency of the oscillator is applied to input 10 of logical circuit 3 shown in more detail in FIG. 2. Input 10 is the input of a decade counter 11 which is cascade connected with a similar decade counter 12. Therefore, the counters 11 and 12 form a frequency divider having a total division rate of $10 \times 10 = 100$. The code outputs ABCD of counters 11 and 12 are connected to the inputs of BCD-decoders 13 and 14 respectively transforming the binary code signals into decadic output signals. The outputs of decoders are connected to contacts of selectors 15 and 16 respectively. Each selector has a selecting contact 17 adjustable to 10 positions (0–9). Contacts 17 are each connected to one of the inputs of an AND-gate 18. Further, the output terminals O of each of decoder 13 and 14 are each connected to one of the inputs of another AND-gate 19. The outputs of gates 18 and 19 are connected to inputs R and S respectively of an RS-flip-flop 20, the output Q of this flip-flop being connected to the input of amplifier 5 shown in FIG. 1.

Operation of the circuits so far described is as follows. As mentioned above, the oscillator frequency is divided by a factor of 100 by means of counters 11 and 12, a decoded decadic output signal being obtained for units from decoder 13 and for tens from decoder 14. Assuming now that selector 15 is turned to position 3 and selector 16 is turned to position 2, this signifying a number 23. The output of gate 18 will always be operative when contacts 17 of both selectors 15 and 16 are operative. The output of gate 19 will always be operative when both decoders 13 and 14 are in their zero position, that is, when their outputs O are simultaneously operative. Flip-flop 20 is set whenever gate 19 is operative, that is, whenever decoders 13 and 14 are in their zero position, and flip-flop 20 is reset again when both contacts 17 are operative, that is when the counting has reached position 23. The flip-flop now remains reset until position 100 is reached and the counter returns to its O-position, in which flip-flop 20 is set again. Thus, the flip-flop remains set during 23 pulses of a complete counting cycle of 100 pulses, that is, a pulse appears at the output of flip-flop 20, of which the duration is 23 units compared with a duration of 77 units of the interval between succeeding pulses. From this it is obvious that by adjustment of decadic selectors 15 and 16 to any desired number between 1 and 99 the ratio between the pulse duration and the pulse inverval may be selected between values of 1:99 and 99:1.

Since the operation of circuit 3 and flip-flop 20 does not depend on the input frequency applied to it from oscillator 1, the above ratios may be adjusted for any desired frequency, the output frequency of flip-flop 20 being adjustable within a range of 1 to 100 Hz by changing the oscillator frequency from 100 to 10,000 Hz.

FIG. 3 and 4 show an embodiment of the lamp for display of the flickering light and adaptation light. This lamp has an outer cylindrical casing 21 mounted on a base 22. Base 22 may be a casing for accommodation of the electronic equipment of the apparatus. Casing 21 has a back 23 and is covered at its front side by an opal glass 24. The space enclosed within casing 21 between back 23 and opal glass 24 is subdivided by a cylindrical separating wall 25 of an opaque material. A ring of incandescent lamps 26 is mounted on back 23 within the annular space defined between casing 21 and separating wall 25, such lamps being connected to a suitable energy source through a regulating device, for instance, a variable resistor as schematically shown at 9 in FIG. 1. Since the adaptation light produced by lamps 26 must not flicker, direct current or alternating current at mains frequency may be used. Since with usual alternating current the flickering frequency is 100 or 120 Hz according to whether the mains frequency is 50 or 60 cycles, the adaptation light will never be perceived as a flickering light. The intensity of the adaptation light may be adjusted to the desired value by means of variable resistor 9.

A gas discharge tube 27 of low inertia is mounted on back 23 inside the separating wall 25. The terminals of this gas discharge tube are connected to the output of amplifier 5. Any suitable means may be provided in amplifier 5 for delivering the necessary voltage and power to gas discharge tube 27 with sufficiently steep flanks of the current pulses flowing in tube 27. As an example the output power may be controlled by thyristors or by means of vacuum tubes. High-frequency alternating power may be controlled by any suitable means such as transistors, thyristors or vacuum tubes, the gas discharge tube 27 being energized either directly by high-frequency power or by rectified high-frequency current.

The terminals of lamps 26 and of gas discharge tube 27 are accessible and connected to cables at the outer side of back 23 which may be made of insulating material. A cover not shown in the drawing may be provided for covering such terminals.

The lamps 26 and the spiral-shaped gas discharge tube 27 are so disposed that the annular portion of the opal glass 24 covering the annular space containing lamps 26 is uniformly illuminated by such lamps, while the circular portion of opal glass 24 inside the separating wall 25 is uniformly illuminated by the gas discharge tube 27. Both light effects are strictly separated from each other by separating wall 25, but no real boundary line is seen along the theoretical boundary line indicated at 28 because wall 25 is very thin compared with the thickness of the opal glass 24. As an example, opal glass 24 has a thickness in the order of 2 – 3 mm while the separating wall 25 has a thickness in the order of 1/10 of a millimeter. The intensity of the flickering light produced by tube 27 may be adjusted by means of regulating means of amplifier 5 such as a variable resistor as schematically shown in FIG. 1.

The size of illuminated areas 7 and 8, the intensity of the illumination and other parameters such as colour of the display dial may be varied within wide limits, there being practically no restrictions. Modifications may be made for adapting the apparatus for various purposes. As an example, a simplified small modification may be provided for personal use. In such an apparatus the flickering frequency may be adjustable, but the ratio between pulse durating and pulse intervals may be constant, for instance, 1:1. Further the intensity of the adaptation light and flicker light may be constant. As schematically shown in FIG. 1, a disengageable locking mechanism may be provided for preventing rotation of the variable resistor for increasing the oscillator frequency. This mechanism comprises a ratchet wheel 30 fixed on the axis of variable resistor 2. A locking pawl formed by a leaf spring 31 is usually disengaged from the toothing of ratchet wheel 30 by means of an eccentric 32 so that variable resistor 2 may be rotated in both directions by means of hand knob 33. When the apparatus is used for testing a person, for instance, in the presence of the police, eccentric 32 is rotated by 180° thereby allowing spring pawl 31 to engage the toothing of ratchet wheel 30. Variable resistor 2 may now only be rotated in a direction for which an initially high frequency decreases to the critical flicker fusion frequency. It is thus impossible for the tested person to turn knob 33 and resistor 2 back towards higher frequencies as soon as flickering is observed, whereby fraudulous operation of the apparatus is prevented.

The apparatus may have a scale for indication of the frequency, wherein a scale illumination may be cut out during operation of the flickering light source and adaptation light source, in order that the tested person cannot read the scale and consequently is not influenced by knowledge of the operating frequency.

What we claim is:

1. A method for measuring the critical flicker fusion frequency of a person, comprising producing light pulses of variable frequency and displaying them to a person to be tested by means of a flickering illumination appearing in the center of a display screen, and producing and displaying simultaneously a ring of continuous adaptation illumination round said flickering light, on the same display screen, said flickering illumination and said adaptation illumination being displayed separately from each other but without visible boundary zone between them.

2. An apparatus for measuring the critical flicker fusion frequency of a person, comprising a circular plane display screen, a flickering light source energized by an electronic variable-frequency pulse generator and disposed for display in a central portion of said screen in order to produce a flickering illumination, and an adaptation light source surrounding said flickering light source and energized for producing a continuous adaptation illumination, said adaptation light source disposed for display in a peripheral portion of said screen, wherein said adaptation light source surrounds said flickering light source without interference and without any visible boundary zone therebetween.

3. An apparatus according to claim 2, comprising means for varying the intensity of the adaptation light source.

4. An apparatus according to claim 2, comprising a flickering light source of low inertia and a rectangular-pulse generator for energizing said flickering light source.

5. An apparatus according to claim 4, wherein said pulse generator includes a means allowing adjustment of a variable ratio between the duration of pulses and pulse intervals respectively.

6. An apparatus according to claim 4, wherein said pulse former includes logical means for preselection of all ratios between entire numbers between 1:99 and 99:1.

7. An apparatus according to claim 2, comprising means for preselection of the pulse amplitude.

8. An apparatus according to claim 2, having a rotatable adjusting member for the generator frequency, and comprising a disengageable locking mechanism allowing rotation of said adjusting member in the sense of decreasing frequencies only if said locking mechanism is engaged.

9. An apparatus for measuring the critical flicker fusion frequency of a person, comprising a flickering light source energized by a variable-frequency pulse generator in order to produce a flickering illumination, and an adaptation light source surrounding said flickering light source and energized for producing a continuous adaptation illumination, said flickering illumination and said continuous adaptation illumination being accommodated in a common illumination unit having a cylindrical casing including a back and an opal disc at its front side, a space enclosed within said casing between said back and opal disc being subdivided by a thin opaque partition wall extending from said back to said disc into concentric compartments, a flash illumination of said flickering light source being located in the inner of said compartments while means for continuous illumination are located in the outer annular compartment.

10. An apparatus according to claim 9, wherein said flash illumination is a spiral-shaped flash tube.

11. An apparatus according to claim 9, wherein said means for continuous illumination comprise a ring of incandescent lamps.

12. An apparatus for measuring the critical flicker fusion frequency of a person, comprising a flickering light source energized by an electronic variable-frequency pulse generator in order to produce a flickering illumination, and an adaptation light source surrounding said flickering light source and energized for producing a continuous adaptation illumination, said flickering illumination and said continuous adaptation illumination being accommodated in a common illumination unit having a casing including an opal disc at its front side, a space enclosed within said casing inside said opal disc, this space being subdivided into concentric compartments by opaque partition means extending from said disc, said flickering light source being located in the inner of said compartments and said means for continuous adaptation illumination being located in the outer annular compartment.

* * * * *